United States Patent
McCollum et al.

(10) Patent No.: US 7,046,033 B2
(45) Date of Patent: May 16, 2006

(54) TERMINATION ENABLE: HARDWARE AND SOFTWARE CONTROLLED ENABLE WITH DETECT

(75) Inventors: Justin McCollum, Lawrenceville, GA (US); Stephen Piper, McDonough, GA (US); Dennis Craton, Douglasville, GA (US)

(73) Assignee: LSI Logic Corporation, Milpitas, CA (US)

( * ) Notice: Subject to any disclaimer, the term of this patent is extended or adjusted under 35 U.S.C. 154(b) by 123 days.

(21) Appl. No.: 10/730,337

(22) Filed: Dec. 8, 2003

(65) Prior Publication Data

US 2005/0122131 A1    Jun. 9, 2005

(51) Int. Cl.
*H03K 19/003* (2006.01)
(52) U.S. Cl. ............................. 326/30; 326/82
(58) Field of Classification Search ............ 326/30, 326/21, 82, 83

See application file for complete search history.

(56) References Cited

U.S. PATENT DOCUMENTS

| | | | |
|---|---|---|---|
| 4,920,339 A | 4/1990 | Friend | |
| 5,313,595 A | 5/1994 | Lewis | |
| 5,434,516 A | 7/1995 | Kosco | |
| 5,920,266 A | 7/1999 | Allgood et al. | |
| 5,983,296 A | 11/1999 | Lamkin et al. | |
| 6,380,758 B1 * | 4/2002 | Hsu et al. | 326/30 |
| 6,850,091 B1 * | 2/2005 | Morris | 326/86 |

* cited by examiner

*Primary Examiner*—Daniel D. Chang
(74) *Attorney, Agent, or Firm*—Suiter West Swantz PC LLC

(57) ABSTRACT

A method and circuit allows flexible control for termination of a signal line. The mode of operation of the circuit may be set manually or automatically. A software controller provides software control of the signal line. A bus terminator is tied to the signal line. A feedback line from the bus terminator permits monitoring the logic level on the signal line by the software controller. The modes permit software control of the termination or operator setting of the termination by grounding of the signal line or pulling up the signal line to the power line.

16 Claims, 4 Drawing Sheets

TERMINATION ENABLE: HARDWARE AND SOFTWARE CONTROLLED ENABLE WITH DETECT

FIELD OF THE INVENTION

The present invention generally relates to the field of bus line signals, and particularly to termination techniques for bus line signals.

BACKGROUND OF THE INVENTION

Signals that operate at high frequencies or travel along long signal path lengths are often terminated to prevent degradation of the signal through ringing and other effects. The transmitted signal is optimally received when the receiving end of the signal path has an impedance matched to the impedance of the transmission point. There are certain situations, such as during testing or when the location of the termination is on another card, where it is desirable to tie the receiver input to a ground level to prevent the reception of spurious signals. A jumper may be used to provide a user with the opportunity to set the mode of operation of the receiver input, such as termination through impedance matching or grounding. With previous designs, the host device could not determine if it had control over the termination or if the jumper was forcing the terminators to be enabled/disabled. This is a problem if the software controlling the testing wants to warn or notify the end user that the termination is software controlled or if the user must examine the jumper settings.

Therefore, it would be desirable to provide a method and circuit to allow better control over signal bus line terminations.

SUMMARY OF THE INVENTION

Accordingly, the present invention is directed to a method and circuit for permitting multiple modes of operation of a signal termination line, especially a bus signal line.

The present invention permits the testing software to determine, through a sense signal, if it has control over the bus controller board's terminators (e.g., SCSI terminators) and to notify the end user if the termination is software controlled. The software may determine the state of the terminators, through the sense signal, even when the terminators are hard shunted. For example, this may be accomplished with an extra register and an available I/O pin.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a method and circuit for establishing and controlling line terminations. The present invention allows a combination of manual and software control for line terminations for bus signals, especially Small Computer System Interface (SCSI) signals. Generally, the method of controlling the termination state of a signal line, in the present invention, involves switching between the multiple bus signal line termination states. Mode setting of operational states is accomplished manually or automatically. Manual setting may be accomplished through jumper wires or the manual setting of a switch. Automatic mode setting may be accomplished through a software controller, a host device, or other device or circuit. Optionally, a state of the bus signal line termination may be monitored and reported. An optional disconnect status signal may be provided for feedback to line driver control circuitry.

Figure 1:
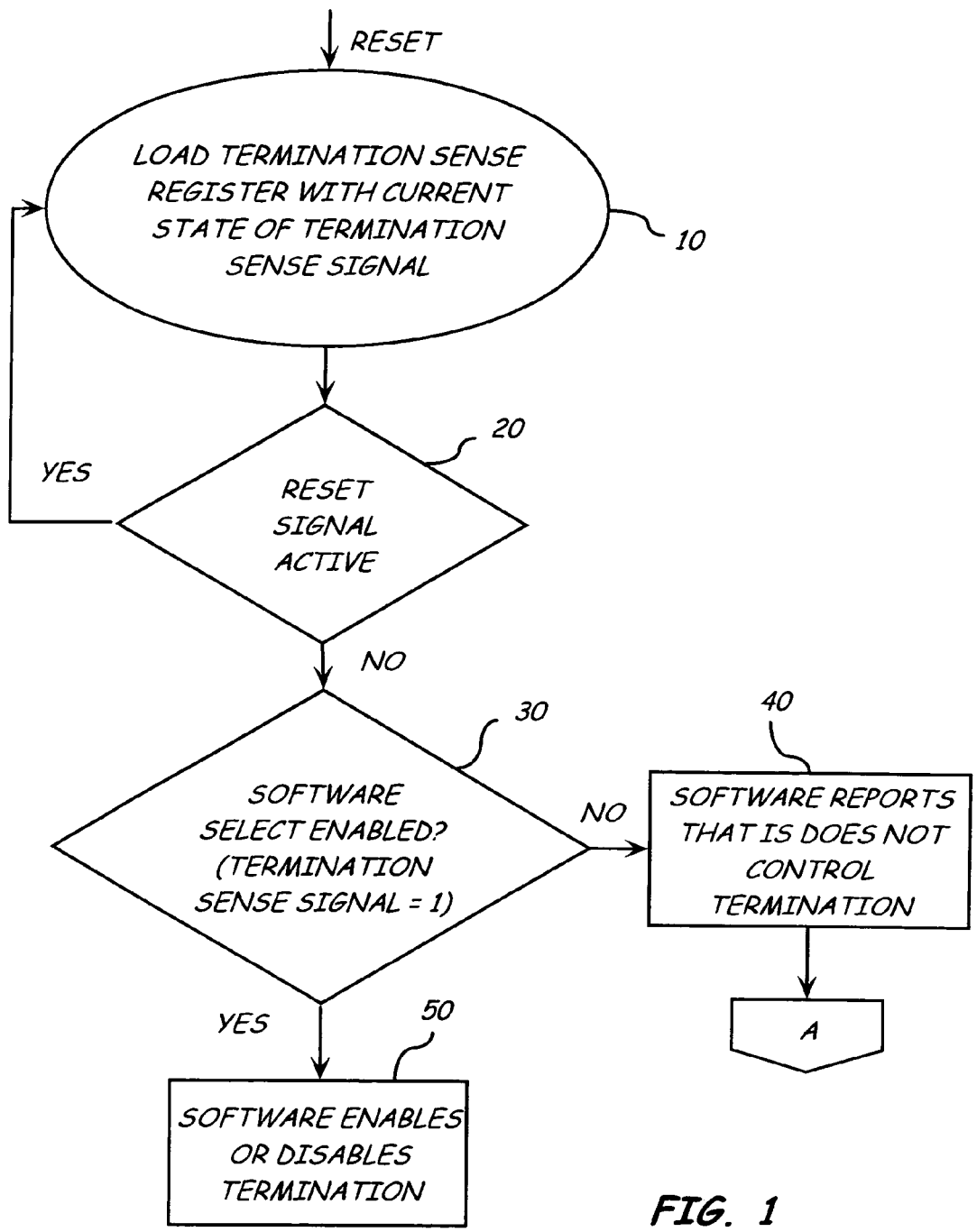
FIG. 1 illustrates an embodiment of a method for software control of a line termination in the present invention.

FIG. 1 illustrates an embodiment of a method of the present invention for setting a bus signal line termination state. After setting a mode of operation of bus signal line termination in which there are multiple bus signal line termination states, a termination sense register is loaded with the current state of the termination sense signal 10. If the circuit is in a reset mode 20, processing returns to the load step 10. Otherwise, a determination is made if the bus signal is under software control 30; that is, if software select has been enabled because the termination sense signal has been set to a logic high level. If it is determined that the bus signal line is under software control 30 (e.g., through a disconnect status signal or other feedback line), setting the enablement state of the bus signal line under software control 50. If the bus signal line is not under software control 30, the software reports that it does not control termination. The report may be internally handled by the circuit logic or handled by the host. A message may be generated for an operator on a graphical user interface to indicate the condition or state of the signal line.

Figure 2:
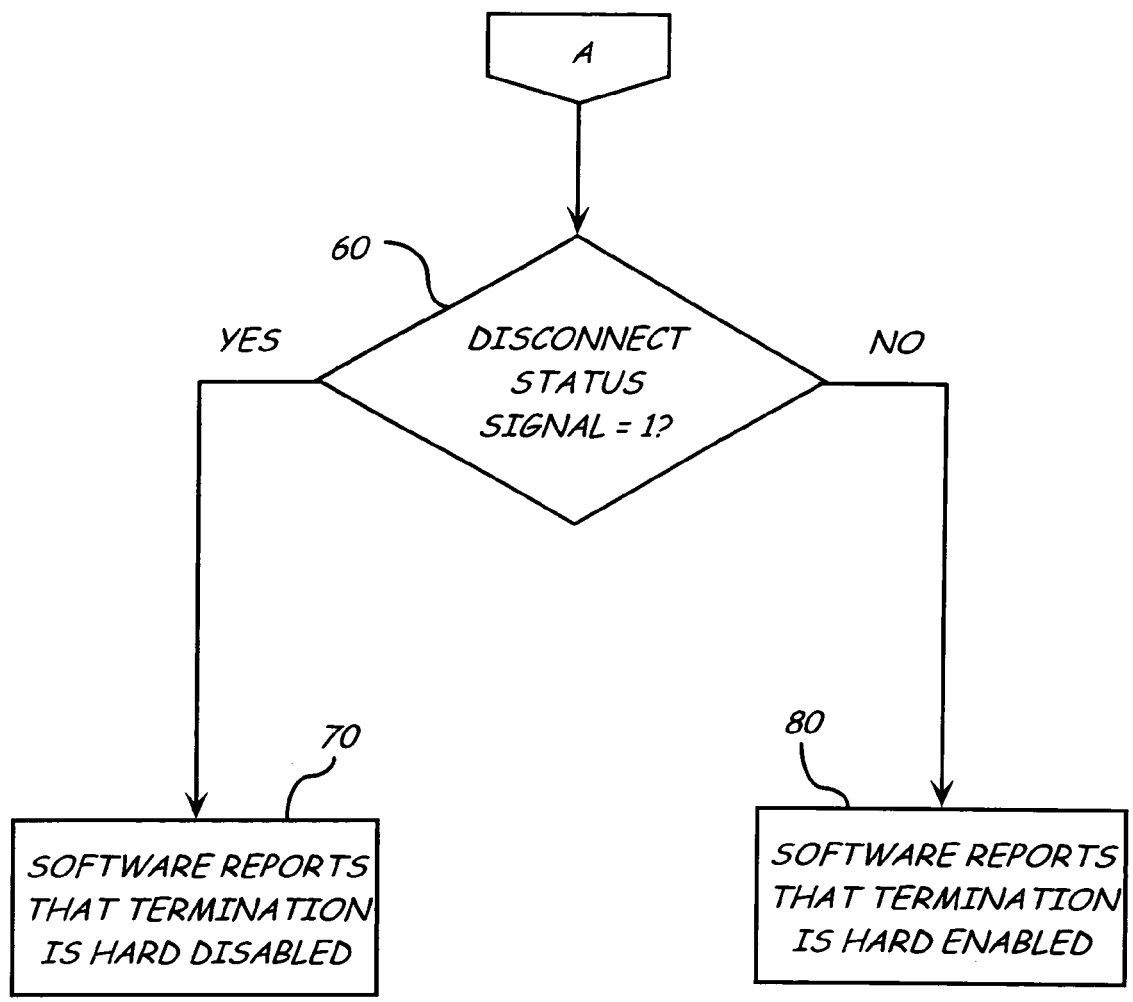
FIG. 2 illustrates an embodiment of a method for reporting back the state of the termination for the bus line.

As illustrated in FIG. 2, optionally, a disconnect status signal is checked 60. If the disconnect status signal is at a logic high level, the software reports that the termination is hard disabled and is at a logic high level 70. If the disconnect status signal is at a logic low level, the software reports that the termination is hard enabled and is at a logic low level 80.

Figure 3:
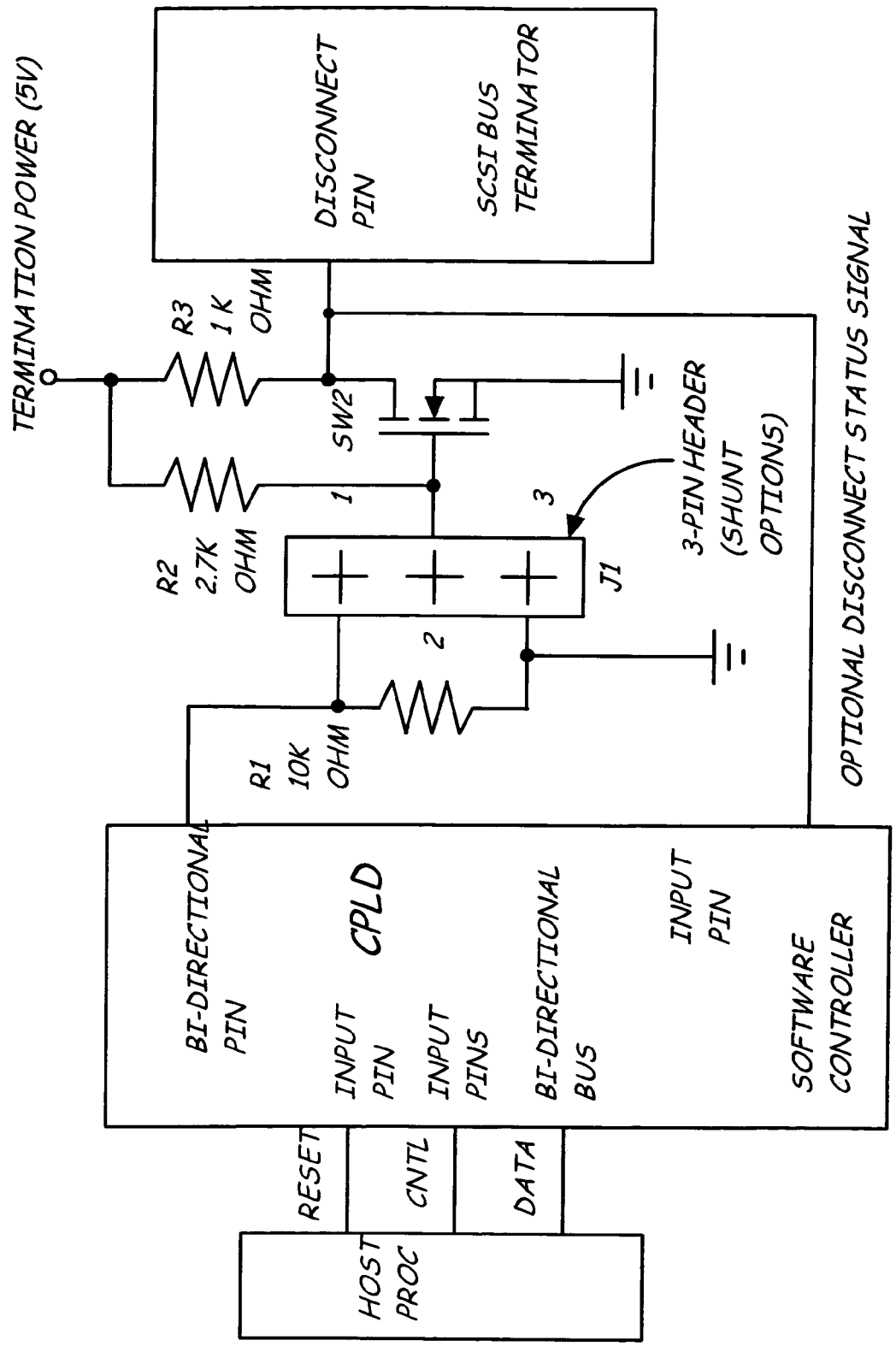
FIG. 3 illustrates a first embodiment of a circuit of the present invention.

FIG. 3 illustrates an embodiment of a bus termination control circuit of the present invention. The software controller of this circuit interfaces with a host device or processor. The host processor transmits a reset signal, control signals, and data signals to the bus termination control circuit. The software controller preferably includes a termination sense register. When enabled, the software controller selectively causes a signal line to be pulled to a voltage level by a control signal. The software controller may be implemented as a complex programmable logic device (CPLD), a field programmable gate array (FPGA), or the like. (A complex programmable logic device uses reprogrammable interconnects or links between logic blocks. A field programmable gate array is a high gate density programmable logic chip.) Enablement of software control is achieved through a mode setting mechanism for the signal line. This mode setting mechanism receives a control signal from the software controller. Depending on the mode setting mechanism configuration the control signal is ignored or transmitted to a bus termination switch. The mode setting mechanism may be a jumper J1. As illustrated in FIG. 3 and Table I (below), in an embodiment, the jumper has three shunt positions. In a first position, when all pins are open, the termination is hardware enabled. In a second position, when pins 1 and 2 are shunted, software select is enabled. In a third position, when pins 2 and 3 are shunted, the termination is hardware disabled (e.g., grounded). A switch SW2 for controlling power to a signal line through the enablement signal is controllable by the mode setting mechanism. The switch SW2 may be a N-channel metal oxide semiconductor (NMOS) transistor, a P-channel metal oxide semiconductor (PMOS) transistor, a bipolar transistor, or other electronic switch. Alternatively, switch SW2 may be an electronically controlled mechanical switch. The control signal of the software controller is directly electrically connected to the first point and is applied to the third point through a resistor so that the resistor electrically connects the first and third points. The third point is directly electrically connected to circuit ground. The second point is directly electrically connected to a control terminal of the switch. The control terminal is electrically connected to power through a first passive element and the power side terminal is electrically connected to power through a second passive element. Preferably, the first and second passive elements are resistors. A bus terminator receives the output signal of the switch.

TABLE I

| J1 Shunt Positions | Termination Settings |
|---|---|
| ALL PINS OPEN | TERMINATION ENABLED |
| PIN 1 AND PIN 2 SHUNTED | SOFTWARE SELECT ENABLED |
| PIN 2 AND PIN 3 SHUNTED | TERMINATION DISABLED |

Figure 4:
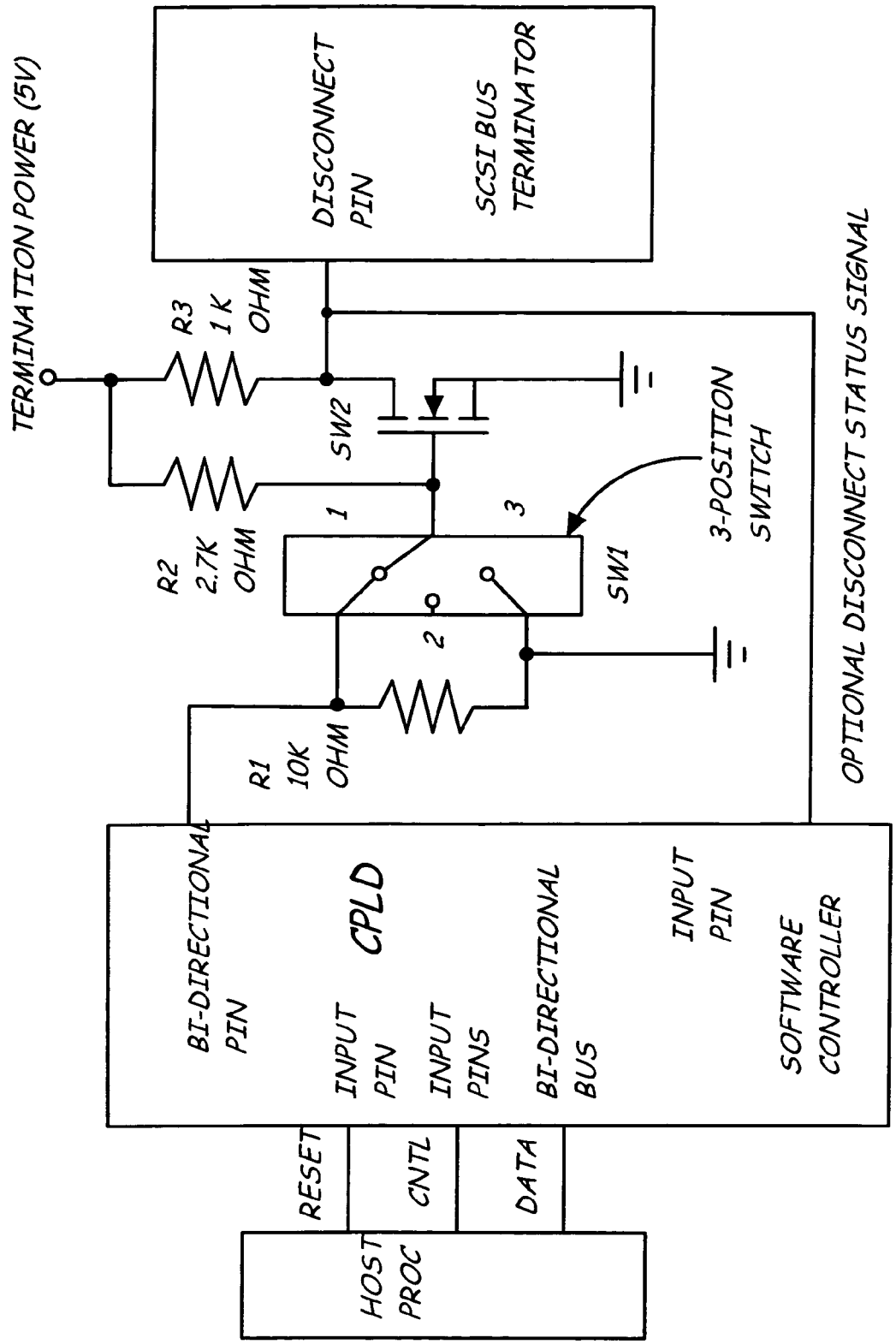
FIG. 4 illustrates a second embodiment of a circuit of the present invention.

FIG. 4 illustrates another embodiment of the circuit of the present invention. The mode setting mechanism may be implemented as a three point or three position switch in which the manual setting of the mechanism is controlled by an operator. In other embodiments, other manual setting mechanisms may be used. Alternatively, automatic setting may be performed by operation of the software controller.

The present invention may be made and/or used in a variety of ways. For example, an integrated circuit (IC) may be used to control the entire logic instead of using a hard jumped or switched enable/disable. Aside from Small Computer System Interface (SCSI) busses, the present invention may be used with other busses that have termination ICs that can be disabled.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A signal line termination circuit, comprising:
   a software controller for providing a control signal for selectively causing a signal line to be pulled to a voltage level;
   a mechanism for permitting setting of a mode for the signal line, the mechanism receiving the control signal from the software controller and providing an enablement signal; and
   a switch for controlling power to the signal line through the enablement signal, the switch being controllable by the mechanism by the control signal, wherein the mechanism is a three point mechanism having a first point, a second point, and a third point, the control signal of the software controller being directly electrically connected to the first point and applied to the third point through a resistor so that the resistor electrically connects the first and third points.

2. The signal line termination circuit of claim 1, further comprising a bus terminator that receives the output signal of the switch.

3. The signal line termination circuit of claim 2, wherein the mechanism is controlled by a manual setting of the mechanism by an operator.

4. The signal line termination circuit of claim 3, wherein the mechanism is a three jumper pin unit.

5. The signal line termination circuit of claim 3, wherein the mechanism is a three position manual switch.

6. The signal line termination circuit of claim 1, wherein the mechanism is controlled by an automatic setting of the mechanism.

7. The signal line termination circuit of claim 6, wherein the automatic setting is performed by operation of the software controller.

8. The signal line termination circuit of claim 7, wherein the software controller is a complex programmable logic device.

9. The signal line termination circuit of claim 7, wherein the software controller is a field programmable gate array.

10. The signal line termination circuit of claim 1, wherein the third point is directly electrically connected to circuit ground.

11. The signal line termination circuit of claim 10, wherein the second point is directly electrically connected to a control terminal of the switch.

12. The signal line termination circuit of claim 11, wherein the switch, in addition to the control terminal, includes a power side terminal and a ground side terminal.

13. The signal line termination circuit of claim 12, wherein the control terminal is electrically connected to power through a first passive element and the power side terminal is electrically connected to power through a second passive element.

14. The signal line termination circuit of claim 13, wherein the power side terminal of the switch is feedback to the software controller.

15. The signal line termination circuit of claim 14, wherein the software controller is communicatively coupled to a host processor.

16. The signal line termination circuit of claim 15, wherein the first and second passive elements are resistors.

* * * * *